(12) United States Patent
Choi et al.

(10) Patent No.: US 11,212,450 B2
(45) Date of Patent: Dec. 28, 2021

(54) CAMERA MODULE FOR BOTH NORMAL PHOTOGRAPHY AND INFRARED PHOTOGRAPHY

(71) Applicant: LG INNOTEK CO., LTD., Seoul (KR)

(72) Inventors: Yong Bok Choi, Seoul (KR); Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 198 days.

(21) Appl. No.: 15/779,430

(22) PCT Filed: Nov. 15, 2016

(86) PCT No.: PCT/KR2016/013139
§ 371 (c)(1),
(2) Date: May 25, 2018

(87) PCT Pub. No.: WO2017/090928
PCT Pub. Date: Jun. 1, 2017

(65) Prior Publication Data
US 2018/0338089 A1   Nov. 22, 2018

(30) Foreign Application Priority Data
Nov. 27, 2015   (KR) .................. 10-2015-0167261

(51) Int. Cl.
*H04N 5/232* (2006.01)
*H04N 5/33* (2006.01)
(Continued)

(52) U.S. Cl.
CPC ......... *H04N 5/23296* (2013.01); *G02B 5/208* (2013.01); *G02B 5/32* (2013.01);
(Continued)

(58) Field of Classification Search
CPC .. H04N 5/23296; H04N 5/332; H04N 5/2254; H04N 5/23245; H04N 5/23287;
(Continued)

(56) References Cited

U.S. PATENT DOCUMENTS 6,824,317 B2 * 11/2004 Finizio ............... G08B 13/1965
396/427
7,298,244 B1 * 11/2007 Cress, Sr. ................ G08B 5/36
340/321
(Continued)

FOREIGN PATENT DOCUMENTS

CN   1573505 A   2/2005
CN   1788234 A   6/2006
(Continued)

OTHER PUBLICATIONS

Office Action dated Feb. 6, 2020 in Chinese Application No. 201680069456.0.
(Continued)

*Primary Examiner* — Helen Shibru
(74) *Attorney, Agent, or Firm* — Saliwanchik, Lloyd & Eisenschenk

(57) ABSTRACT

A camera module for both normal photography and infrared photography comprises: an optical filter unit for selectively transmitting either infrared rays or visible light; an angle-of-view changing unit for narrowing the angle of view by refracting the infrared rays when the infrared rays pass through the optical filter unit, and transmitting the visible light without changing the angle of view when the visible light passes through the optical filter unit; and an image sensor for generating a normal image when the visible light is incident thereto and generating an infrared image when the infrared rays are incident thereto.

20 Claims, 9 Drawing Sheets

(51) Int. Cl.
*H04N 5/225* (2006.01)
*G03B 11/00* (2021.01)
*G02B 7/08* (2021.01)
*G02B 5/20* (2006.01)
*G06K 9/00* (2006.01)
*G02B 5/32* (2006.01)
*G02B 27/64* (2006.01)
*G03B 5/00* (2021.01)

(52) U.S. Cl.
CPC .............. *G02B 7/08* (2013.01); *G03B 11/00* (2013.01); *G06K 9/00604* (2013.01); *H04N 5/2254* (2013.01); *H04N 5/332* (2013.01); *G02B 27/646* (2013.01); *G03B 5/00* (2013.01); *G03B 2205/00* (2013.01); *G03B 2205/0007* (2013.01); *G03B 2205/0046* (2013.01); *G03B 2205/0069* (2013.01); *H04N 5/23287* (2013.01)

(58) Field of Classification Search
CPC . G02B 7/08; G02B 5/208; G02B 5/32; G02B 27/646; G06K 9/00604; G03B 11/00; G03B 2205/0092; G03B 2205/0046; G03B 2205/0007; G03B 2205/0069; G03B 5/00; G03B 13/36
See application file for complete search history.

(56) References Cited

U.S. PATENT DOCUMENTS

| | | | | |
|---|---|---|---|---|
| 2006/0049352 A1* | 3/2006 | Irani | ................ | G01J 5/0265 250/339.02 |
| 2006/0169904 A1* | 8/2006 | Grobmyer | ............. | G01N 21/21 250/341.4 |
| 2006/0171704 A1* | 8/2006 | Bingle | ................. | H04N 5/2254 396/419 |
| 2008/0238323 A1* | 10/2008 | Chan | ...................... | H05K 3/284 315/35 |
| 2009/0015388 A1* | 1/2009 | Yagi | .................... | B60Q 1/0035 340/435 |
| 2010/0301779 A1* | 12/2010 | Spartano | ................ | H05B 45/00 315/320 |
| 2011/0242457 A1* | 10/2011 | Lee | ................... | G02F 1/133615 349/63 |
| 2012/0075510 A1* | 3/2012 | Sato | ........................ | G02B 5/281 348/273 |
| 2012/0218321 A1* | 8/2012 | Ake | ................. | H04N 21/42202 345/690 |
| 2012/0249863 A1* | 10/2012 | Scussat | .................... | H04N 5/33 348/370 |
| 2015/0365568 A1* | 12/2015 | Topliss | ............... | H02K 41/0356 348/360 |
| 2016/0092720 A1* | 3/2016 | Lee | .................... | G06K 9/00604 348/78 |
| 2016/0170105 A1* | 6/2016 | Nagaya | ................. | G02B 5/208 359/885 |
| 2016/0180169 A1* | 6/2016 | Bae | .................... | G06K 9/00604 382/117 |
| 2017/0140224 A1* | 5/2017 | Wilson | ............... | G06K 9/00604 |

FOREIGN PATENT DOCUMENTS

| | | |
|---|---|---|
| CN | 103037172 A | 4/2013 |
| JP | 2003-78786 A | 3/2003 |
| JP | 2003-259167 A | 9/2003 |
| JP | 2007-293507 A | 11/2007 |
| JP | 2010-233857 A | 10/2010 |
| KR | 20-0355279 Y1 | 7/2004 |
| KR | 10-2005-0102338 A | 10/2005 |
| KR | 10-1323483 B1 | 10/2013 |
| KR | 10-2014-0025635 A | 3/2014 |
| KR | 10-2015-0037628 A | 4/2015 |
| KR | 10-2015-0077179 A | 7/2015 |
| KR | 10-2015-0080728 A | 7/2015 |
| KR | 10-2015-0085417 A | 7/2015 |

OTHER PUBLICATIONS

International Search Report in International Application No. PCT/KR2016/013139, filed Nov. 15, 2016.
Office Action dated Aug. 23, 2021 in Korean Application No. 10-2015-0167261.

* cited by examiner

CAMERA MODULE FOR BOTH NORMAL PHOTOGRAPHY AND INFRARED PHOTOGRAPHY

CROSS-REFERENCE TO RELATED APPLICATIONS

This application is the U.S. national stage application of International Patent Application No. PCT/KR2016/013139, filed Nov. 15, 2016, which claims priority to Korean Application No. 10-2015-0167261, filed Nov. 27, 2015, the disclosures of each of which are incorporated herein by reference in their entirety.

TECHNICAL FIELD

The teachings in accordance with exemplary and non-limiting embodiments of this invention relate generally to a camera module for both normal photography and infrared photography.

BACKGROUND ART

Recently, a smart phone, a tablet PC, a gamer and CCTV are mounted with a camera module for photographing a subject and photographing a digital image or a video. Recently, a security system certifying a user has been developed by photographing a pattern of a user's iris using a camera module. The Korean Registered Patent No.: 10-1323483 (registered on Oct. 23, 2103), discloses a technology in which a combined iris recognition and camera including a general image mode and an iris recognition image mode is provided to image a visible light image and recognize an iris through the iris recognition image mode, thereby completely implementing two functions.

However, the abovementioned iris recognition-cum camera having a general photographing mode and iris recognition photographing mode separates a visible light path and an infrared path using a combined prism, and the visible light is provided to a visible light image sensor and the infrared is provided to an iris photographing image sensor, such that two image sensors must be used, thereby causing a manufacturing cost of camera module to increase and greatly increasing the size of camera module, and as a result, the iris recognition-cum camera suffers from disadvantages of being difficult in being applied to a smart-sized IT products such as smart phones and the like.

Furthermore, in the case of the combined prism that separates a visible light path and an infrared path in the iris recognition-cum camera having a general image photographing mode and iris recognition photographing mode, the size of the combined prism is very big to thereby increase the size of camera module as well.

Meantime, the Korean Utility Model No.: 20-0355279 (registered on Jun. 26, 2004) discloses an iris photographing cum general photographing camera module in which the iris photographing and general image photographing are enabled using a single CCD element. The iris photographing cum general image photographing camera includes a concave mirror, a single CCD element, an infrared cut-off filter and a visible light cut-off filter. The iris cum general image photographing camera includes a concave mirror as one element for photographing an iris. The concave mirror is disposed at an outside of a camera module, and because the concave mirror is disposed at an outside of the camera module, a camera module including a concave mirror is inevitably increased in size, thereby making it difficult to be applied to small sized IT devices such as smart phones.

DETAILED DESCRIPTION OF THE INVENTION

Technical Subject

The present invention provides a camera module for both normal photography and infrared photography configured to realize both the iris photographing and normal photographing using a single image sensor.

The present invention provides a small-sized camera module for both normal photography and infrared photography configured to be mounted on a small IT devices such as a smart phone in addition to realization of both the iris photographing and normal photographing using a single image sensor.

The present invention provides a camera module for both normal photography and infrared photography configured to realize both normal photography and infrared photography with a small size using a single image sensor, to enhance the quality of iris image by accurately photographing an iris through decreased viewing angle when photographing an iris, and to realize a normal image with an excellent quality by minimizing decreased viewing angle of visible light during the normal photographing.

Technical Solution

In one general aspect of the present invention, there is provided a camera module for both normal photography and infrared photography comprising:

an optical filter unit for selectively transmitting either infrared rays or visible light;

an angle-of-view changing unit for narrowing the angle of view by refracting the infrared rays when the infrared rays pass through the optical filter unit, and transmitting the visible light without changing the angle of view when the visible light passes through the optical filter unit; and an image sensor for generating a normal image when the visible light is incident thereto and generating an infrared image when the infrared rays are incident thereto.

Preferably, but not necessarily, the infrared rays incident on the image sensor may include infrared rays reflected from an iris.

Preferably, but not necessarily, the optical filter unit may include an infrared cut-off filter cutting off the infrared rays but passing the visible light through, an infrared transmission filter selectively transmitting the infrared rays, and an actuator that places one of the infrared cut-off filter and the infrared transmission filter on an optical path formed between the optical filter unit and the image sensor.

Preferably, but not necessarily, the angle-of-view changing unit may be disposed on the infrared transmission filter.

Preferably, but not necessarily, the infrared transmission filter and the angle-of-view changing unit may be integrally formed.

Preferably, but not necessarily, the camera module for both normal photography and infrared photography may further comprise a coupling member coupling the infrared transmission filter and the angle-of-view changing unit.

Preferably, but not necessarily, the camera module for both normal photography and infrared photography may further comprise a lens assembly having an optical lens disposed with an incident surface on which the infrared rays and visible light are incident and a light emitting surface from which the infrared rays and visible light are emitted.

Preferably, but not necessarily, the angle-of-view changing unit may be adjacently disposed with the incident surface.

Preferably, but not necessarily, the angle-of-view changing unit may be adjacently disposed with the light emitting surface.

Preferably, but not necessarily, the lens assembly may include a body accommodating the optical lens, and the angle-of-view changing unit may be disposed at an inside of the body.

Preferably, but not necessarily, the angle-of-view changing unit may be so formed as to have an area smaller than a plain area of the lens.

Preferably, but not necessarily, the angle-of-view changing unit may include an HOE (Holographic Optical Element) lens.

Preferably, but not necessarily, the angle-of-view changing unit may change an angle-of-view of the infrared rays to between 30°~60°.

Preferably, but not necessarily, the camera module for both normal photography and infrared photography may further comprise a VCM (Voice Coil Motor) performing an auto focus and handshake correction (OIS: Optical Image Stabilization) functions by driving the lens assembly.

Preferably, but not necessarily, the angle-of-view changing unit may be formed in a square plate shape, and the body of the lens assembly may be formed with a coupling groove to fix corners of the angle-of-view changing unit.

Preferably, but not necessarily, the camera module for both normal photography and infrared photography may further comprise an infrared generating device to generate infrared rays.

In another general aspect of the present invention, there is provided a camera module for both normal photography and infrared photography, comprising:

an optical filter unit including an infrared transmission filter and an infrared cut-off filter;

a view-of-angle changing unit for narrowing an angle of view over a case when the visible light passes through the optical filter unit, when the infrared rays pass through the optical filter unit; wherein any one of the infrared transmission filter of the optical filter unit and the infrared cut-off filter is selectively arranged on a light path.

Advantageous Effects

The camera module for both normal photography and infrared photography according to the present invention is enabled to realize both the iris photographing and normal photographing using a single image sensor.

The present invention can provide a small-sized camera module for both normal photography and infrared photography mountable on a small IT device such as a smart phone, in addition to realization of both the iris photographing and normal photographing using a single image sensor.

The present invention provides a camera module to realize both normal photography and infrared photography with a small size using a single image sensor, to enhance the quality of iris image by accurately photographing an iris through decreased viewing angle when photographing an iris, and to realize a normal image with an excellent quality by minimizing decreased viewing angle of visible light during the normal photographing.

BEST MODE

Figure 1:
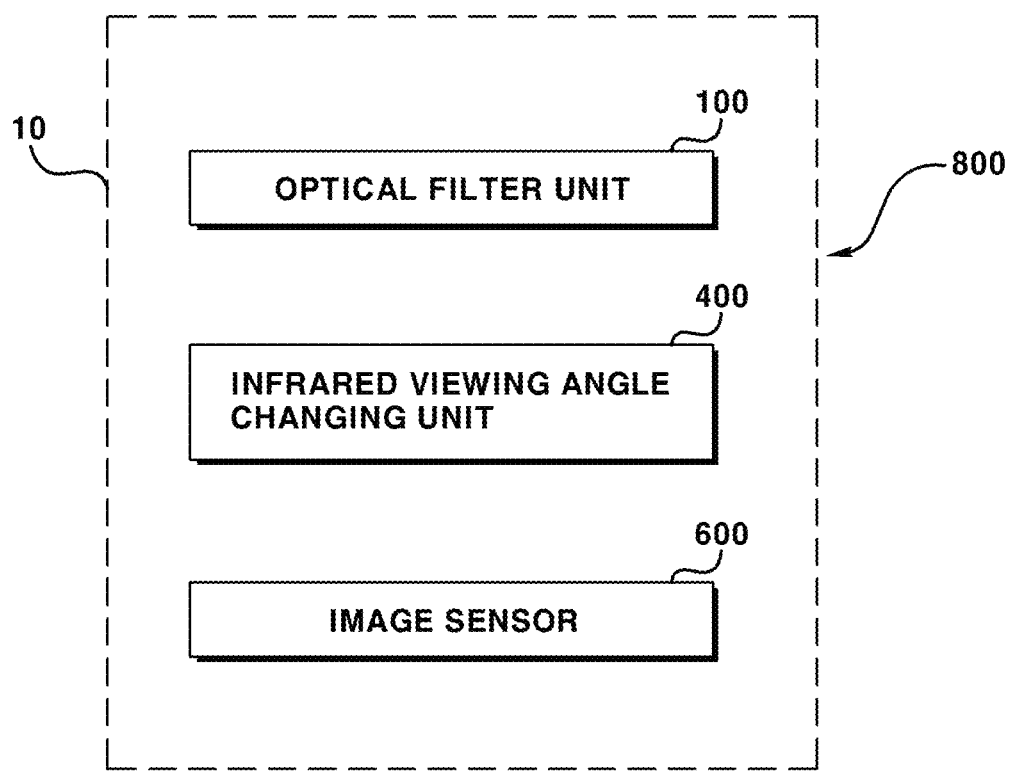
FIG. 1 is a block diagram illustrating a camera module for both normal photography and infrared photography according to an exemplary embodiment of the present invention.

It should be noted that detailed descriptions of well-known functions, configurations or constructions are omitted for brevity and clarity so as not to obscure the description of the present disclosure with unnecessary detail.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Thus, it should be appreciated that the exemplary embodiments and configurations illustrated in the drawings described in the specification are merely preferable exemplary embodiments, and do not represent all the ideas of the present invention, and there may be alterations, modifications, equivalents and variations that can replace these ideas at the time of filing the application.

Figure 2:
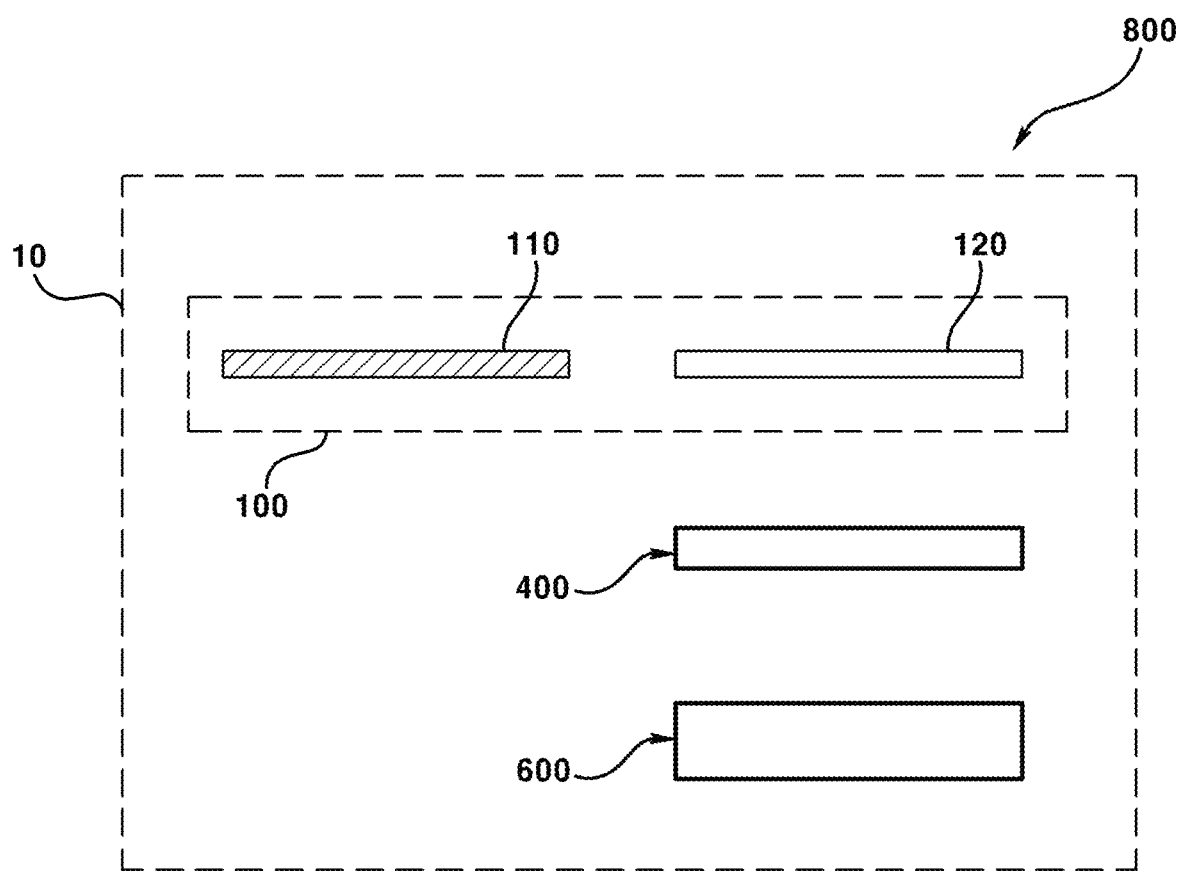
FIG. 2 is a block diagram illustrating a detailed configuration of an optical filter unit of FIG. 1.

FIG. 1 is a block diagram illustrating a camera module for both normal photography and infrared photography according to an exemplary embodiment of the present invention, and FIG. 2 is a block diagram illustrating a detailed configuration of an optical filter unit of FIG. 1.

Referring to FIGS. 1 and 2, a camera module (800) for both normal photography and infrared photography according to an exemplary embodiment of the present invention may include an optical filter unit (100), an angle-of-view (hereinafter referred to also as "viewing angle", or "view angle") changing unit (400) and an image sensor (600). In the exemplary embodiment of the present invention, the optical filter unit (100), the angle-of-view (viewing angle) changing unit (400) and the image sensor (600) may all be embedded inside of a case (10) of the camera module (800) for both normal photography and infrared photography.

The optical filter unit (100) may serve to selectively transmit either infrared rays or visible light provided from outside. The infrared rays provided to the optical filter unit (100) may be included in the natural light or may be artificially generated from an infrared ray generating device such as an infrared ray LED.

Figure 3:
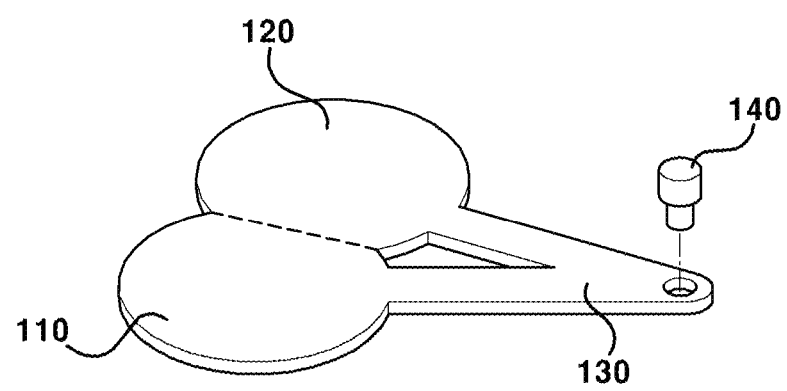
FIG. 3 is a perspective view illustrating an optical filter unit of FIG. 2 according to an exemplary embodiment of the present invention.

FIG. 3 is a perspective view illustrating an optical filter unit of FIG. 2 according to an exemplary embodiment of the present invention.

Referring to FIGS. 2 and 3, the optical filter unit (100) may include an infrared cut-off filter (110) and an infrared transmission filter (120). Furthermore, the optical filter unit (100) may include an infrared cut-off filter (110), an infrared transmission filter (120) and an actuator (140). Additionally, the optical filter unit (100) may further include a frame (130), which is a connection structure.

The infrared cut-off filter (110) may serve to selectively cut off the infrared rays and visible light provided from outside of the optical filter unit (100), whereby the visible light can pass through the infrared cut-off filter (110) of the optical filter unit (100). The infrared cut-off filter (110) may be formed with a thin film layer with a thin thickness in order to inhibit increased size of the camera module (800) for both normal photography and infrared photography.

The infrared transmission filter (120) may serve to selectively cut off the infrared rays and visible light provided from outside of the optical filter unit (100), whereby the infrared rays can selectively pass through the infrared transmission filter (120). The infrared transmission filter (120) in the exemplary embodiment of the present invention may be arranged on the same planar surface with the infrared cut-off filter (110).

When the infrared transmission filter (120) and the infrared cut-off filter (110) are arranged on the same planar surface, the size of the camera module (800) for both normal photography and infrared photography can be greatly reduced over a case when the infrared transmission filter (120) and the infrared cut-off filter (110) are arranged to be mutually overlapped, whereby the camera module (800) for both normal photography and infrared photography can be easily mounted on a small-sized IT device such as a smart phone.

Referring to FIG. 3, the infrared transmission filter (120) and the infrared cut-off filter (110) that are arranged on the same planar surface may be mutually connected or coupled by the frame (130). In order to couple the infrared transmission filter (120) and the infrared cut-off filter (110) on the same planar surface, the frame (130) according to the exemplary embodiment of the present invention may take a bent V-cut plate shape when viewed from a plane side.

The actuator (140) may be coupled to a through hole formed at the bent portion of the frame (130) to thereby rotate the frame (130). The actuator (140) according to the exemplary embodiment of the present invention may use a super small-sized motor rotating the frame (130), for example.

Although the exemplary embodiment of the present invention has illustrated and explained that the actuator (140) rotating the frame (130) is a super small sized motor, the actuator (140) may use various rotating devices capable of rotating the frame (130). For example, the actuator (140) may be driven by a piezo, electronic solenoid or stepping motor.

Referring to FIGS. 1 and 2 again, the angle-of-view ("viewing angle", or "view angle") changing unit (400) can change a view angle of the infrared rays having passed through the optical filter unit (100). The view angle changing unit (400) may be formed in a sheet or a thin film layer of thin thickness, and the view angle changing unit (400) is formed in a sheet or a thin film layer of thin thickness according to the exemplary embodiment of the present invention whereby an overall size of camera module (800) for both normal photography and infrared photography can be greatly reduced to allow being easily applied to a small-sized IT product such as a smart phone.

The view angle changing unit (400) in the exemplary embodiment of the present invention may be disposed at an inside of the case (10) and the view angle changing unit (400) may be disposed on an optical path defined as a path in which the light having passed the optical filter unit (100) is provided to the image sensor (600).

The view angle changing unit (400) may serve to narrow a viewing angle by refracting the infrared rays having passed through the infrared transmission filter (120) of the optical filter unit (100). That is, the optical filter unit (100) may adjust a viewing angle by refracting a particular wavelength range such as infrared rays. The view angle changing unit (400) may form a first viewing (view) angle by refracting the infrared rays having passed the optical filter unit (100) at a first refractive index, for example. The first viewing angle in the exemplary embodiment of the present invention may be about 30°~60°. To be more specific, the view angle changing unit (400) may form the first view angle having passed the optical filter unit (100) at 40°~50°.

When the view angle is narrowed by refracting the infrared rays having passed the infrared transmission filter (120) of the optical filter unit (100) by the first refractive index, an iris recognition rate can be greatly improved by greatly improving a resolution of iris during infrared photography for iris recognition.

Meantime, the view angle changing unit (400) may be such that the visible light having passed through the infrared cut-off filter (110) of the optical filter unit (100) is not refracted or minimized in refraction to be transmitted from the viewing angle changing unit (400). However, when the view angle changing unit (400) is arranged on the progressing path of the visible light, the visible light passing through the viewing angle changing unit (400) may be refracted at a second refraction index smaller than a first refraction index, where the second refraction index of the visible light may be formed with a size, the level of which may be negligible over the first refraction index.

In the exemplary embodiment of the present invention, the view angle changing unit (400), which narrows an viewing angle by refracting the infrared rays when the infrared rays are incident, and which does not narrow the viewing angle by not refracting the visible light or refracting with a very small refraction index when the visible light is incident, may be realized by an HOE (Holographic Optical Element) lens having a positive (+) power relative to a particular wavelength range, for example.

Referring to FIGS. 1 and 2 again, the image sensor (600) may convert an incident visible light to a general (normal) image when a visible light is incident through the viewing angle changing unit (400), and convert an incident infrared rays to an infrared image when the infrared rays are incident through the view angle changing unit (400).

Figure 4:
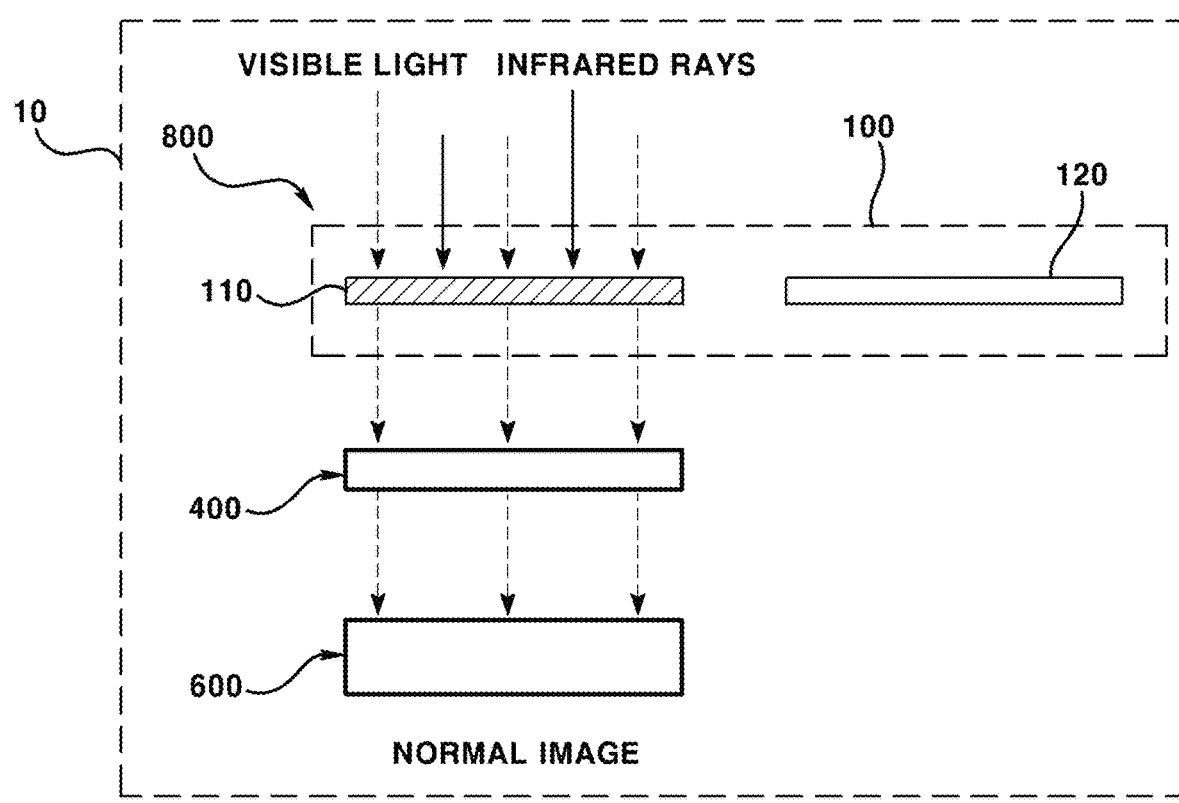
FIG. 4 is a cross-sectional view illustrating a general image photographed by using the camera module for both normal photography and infrared photography of FIG. 1.

FIG. 4 is a cross-sectional view illustrating a general image photographed by using the camera module for both normal photography and infrared photography of FIG. 1.

Referring to FIGS. 1 and 4, the infrared cut-off filter (110) of the optical filter unit (100) for photographing a general image may be aligned with the viewing angle changing unit (400). Under this state, the infrared rays in the visible light and infrared rays incident to the optical filter unit (100) may be cut off by the infrared cut-off filter (110).

The visible light having transmitted the optical filter unit (100) can pass through the viewing angle changing unit (400), and the visible light may not be refracted, or refracted with a minimum refraction index or with a very small refraction index while passing through the viewing angle changing unit (400) and may be incident on the image sensor (600) after passing through the viewing angle changing unit (400) whereby a general image can be photographed by the image sensor (600).

Figure 5:
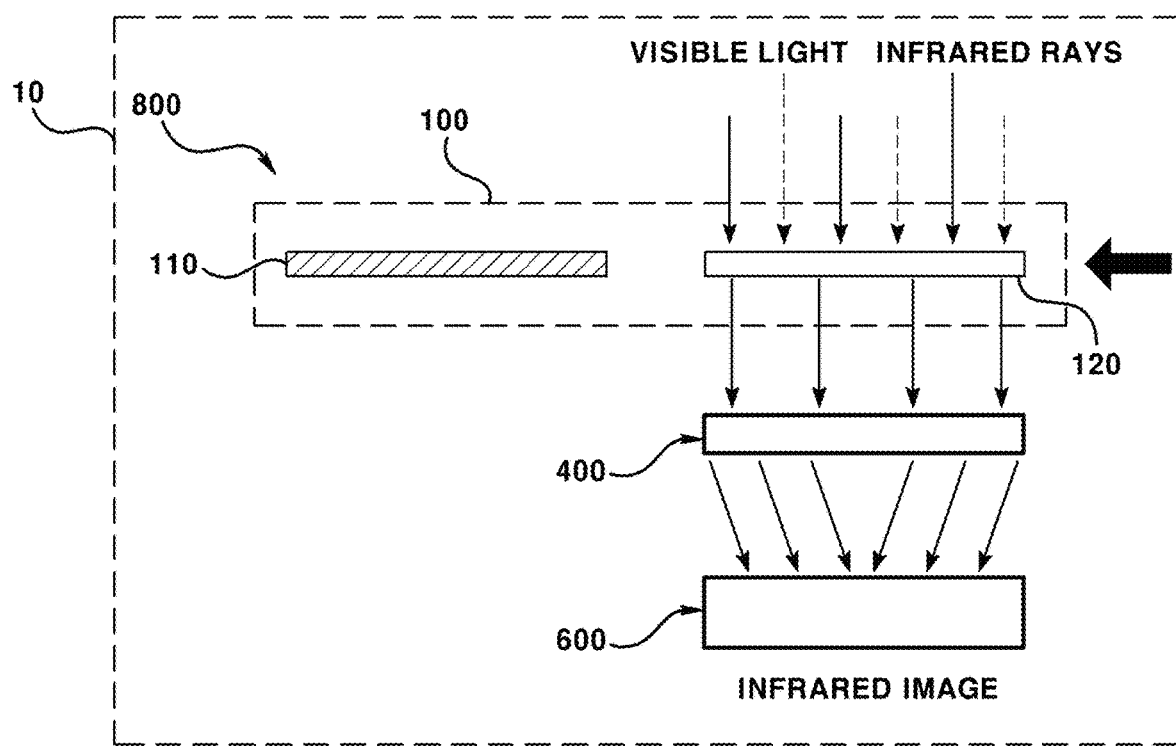
FIG. 5 is a cross-sectional view illustrating an infrared image photographed by using the camera module for both normal photography and infrared photography of FIG. 1.

FIG. 5 is a cross-sectional view illustrating an infrared image photographed by using the camera module for both normal photography and infrared photography of FIG. 1.

Referring to FIGS. 1 and 5, the infrared transmission filter (120) of the optical filter unit (100) for photographing a normal image may be aligned with the viewing angle changing unit (400) by the actuator (140) of FIG. 3. As a result, the visible light in the visible light and infrared rays incident to the optical filter unit (100) is cut-off while the infrared rays pass through the infrared transmission filter (120).

The infrared rays having transmitted through the optical filter unit (100), which has been refracted and narrowed in viewing angle by passing through the viewing angle changing unit (400) and narrowed in viewing angle by passing through the viewing angle changing unit (400), may be incident on the image sensor (600) and an infrared image can be photographed by the image sensor (600). The viewing angle changing unit (400) may change the viewing angle of the infrared rays to a narrow angle of about 30°~60°, for example.

The infrared image photographed by using the camera module for both normal photography and infrared photography in the exemplary embodiment of the present invention may be an image of iris, and the infrared image narrowed in viewing angle through the viewing angle changing unit (400) can photograph an iris with a high resolution.

The infrared rays for photographing an iris in the exemplary embodiment of the present invention may be infrared rays included in the natural light, or infrared rays generated by an infrared generating device such as an infrared LED. The infrared generating device like the infrared LED may be mounted on an upper surface of the case (10) or a lateral surface and a surrounding surface of the case (10).

Figure 6:
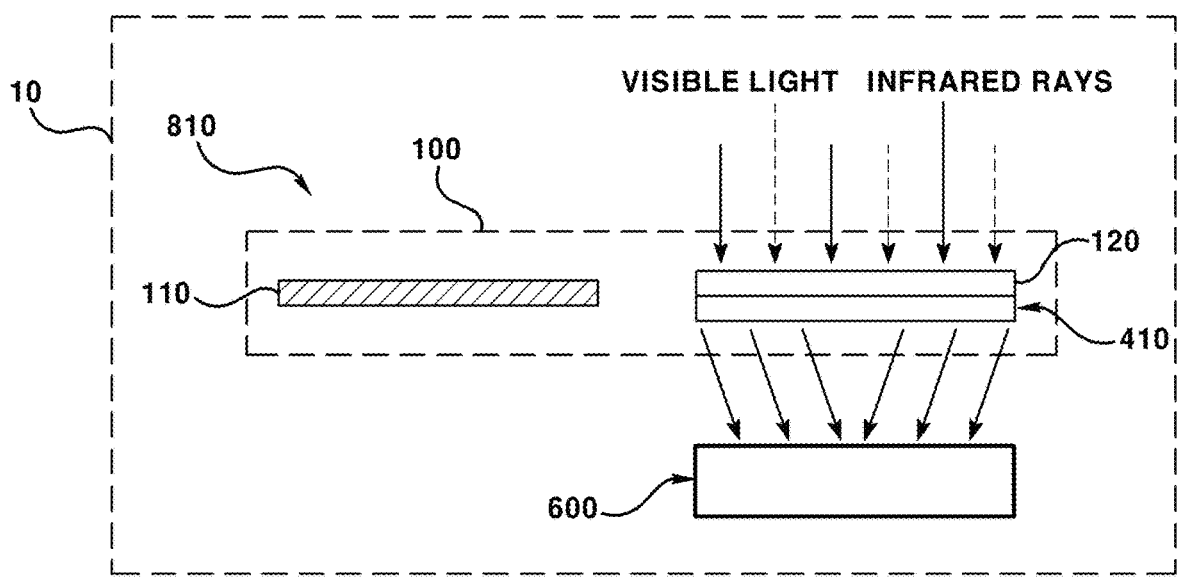
FIG. 6 is a cross-sectional view illustrating a camera module for both normal photography and infrared photography according to another exemplary embodiment of the present invention.

FIG. 6 is a cross-sectional view illustrating a camera module (810) for both normal photography and infrared photography according to another exemplary embodiment of the present invention.

The camera module for both normal photography and infrared photography illustrated in FIG. 6 is substantially same as the camera module for both normal photography and infrared photography illustrated in FIG. 5 except for a viewing angle changing unit (410). Thus, redundant explanation of same configurations will be omitted and same reference numerals and designations will be given to the same configurations.

Referring to FIG. 6, the camera module (810) for both normal photography and infrared photography according to another exemplary embodiment of the present invention may include an optical filter unit (100), an angle-of-view changing unit (410) and an image sensor (600). In the exemplary embodiment of the present invention, the optical filter unit (100), the angle-of-view changing unit (410) and the image sensor (600) may all be embedded inside of a case (10).

The viewing angle changing unit (410) in the exemplary embodiment of the present invention may be disposed at an upper surface of an infrared transmission filter (120) or a bottom surface facing the upper surface, and the viewing angle changing unit (410) in the exemplary embodiment of the present invention may be disposed at a bottom surface of the infrared transmission filter (120).

The viewing angle changing unit (410) may be formed by being bonded to the infrared transmission filter (120), or the viewing angle changing unit (410) may be integrally formed with the infrared transmission filter (120).

When the viewing angle changing unit (410) is arranged at the infrared transmission filter (120) in the exemplary embodiment of the present invention, the viewing angle changing unit (410) is not arranged on a proceeding path of visible light when photographing a normal image, such that the visible light having passed an infrared cut-off filter (110) can be completely inhibited from being refracted or changed by the viewing angle changing unit (410) to thereby improve the quality of normal image.

Figure 7:
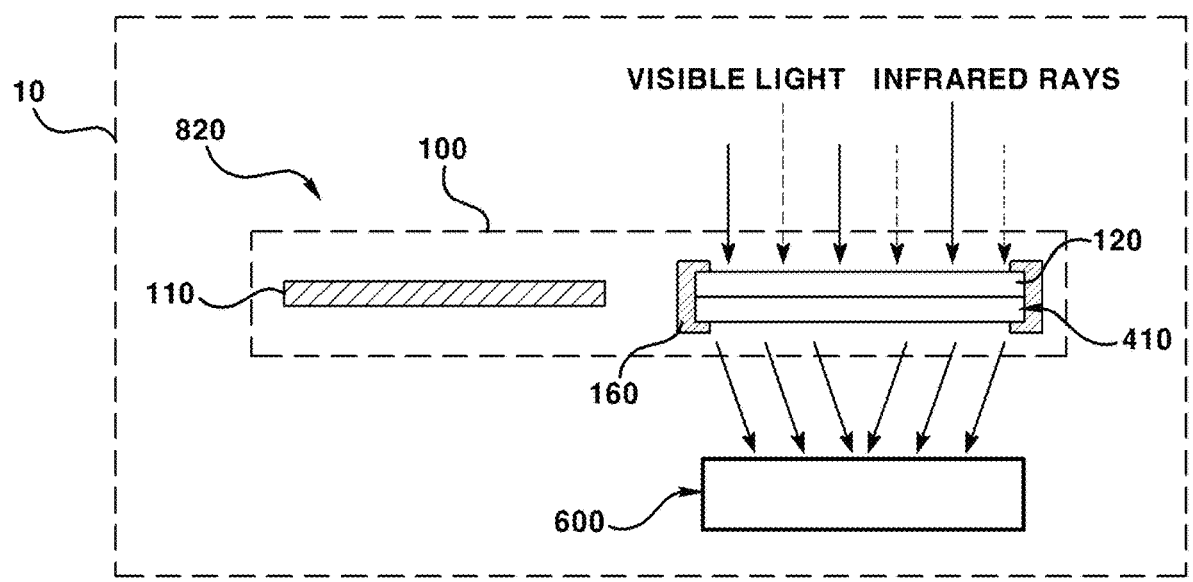
FIG. 7 is a cross-sectional view illustrating a camera module for both normal photography and infrared photography according to still another exemplary embodiment of the present invention.

FIG. 7 is a cross-sectional view illustrating a camera module for both normal photography and infrared photography according to still another exemplary embodiment of the present invention.

The camera module (820) for both normal photography and infrared photography illustrated in FIG. 7 is substantially same as the camera module for both normal photography and infrared photography illustrated in FIG. 6 except for a viewing angle changing unit (410) and a coupling member (160) coupling the infrared transmission filter (120). Thus, redundant explanation of same configurations will be omitted and same reference numerals and designations will be given to the same configurations.

Referring to FIG. 7, the camera module (820) for both normal photography and infrared photography according to another exemplary embodiment of the present invention may include an optical filter unit (100), an angle-of-view changing unit (410), a coupling member (160) and an image sensor (600). In the exemplary embodiment of the present invention, the optical filter unit (100), the angle-of-view changing unit (410), the coupling member (160) and the image sensor (600) may all be embedded inside of a case (10).

The angle-of-view changing unit (410) may be directly arranged on the infrared transmission filter (120) of the optical filter unit (100), and may not be arranged on the infrared cut-off filter (110) of the optical filter unit (100).

The viewing angle changing unit (410) in the exemplary embodiment of the present invention may be disposed at an upper surface of an infrared transmission filter (120) or a bottom surface facing the upper surface, and the viewing angle changing unit (410) in the exemplary embodiment of the present invention may be disposed at a bottom surface of the infrared transmission filter (120).

The coupling member (160) may serve to mutually couple the viewing angle changing unit (410) and the infrared transmission filter (120), and the coupling member (160) may inhibit the viewing angle changing unit (410) and the infrared transmission filter (120) from being mutually separated, by being coupled to edges of the viewing angle changing unit (410) and the infrared transmission filter (120), for example.

The coupling member (160) in the exemplary embodiment of the present invention may serve to inhibit the change of refractive angle of infrared rays due to adhesive, to inhibit adhesion defect and to inhibit the number of assembly processes caused by adhesion process when the viewing angle changing unit (410) and the infrared transmission filter (120) are mutually bonded.

Figure 8:
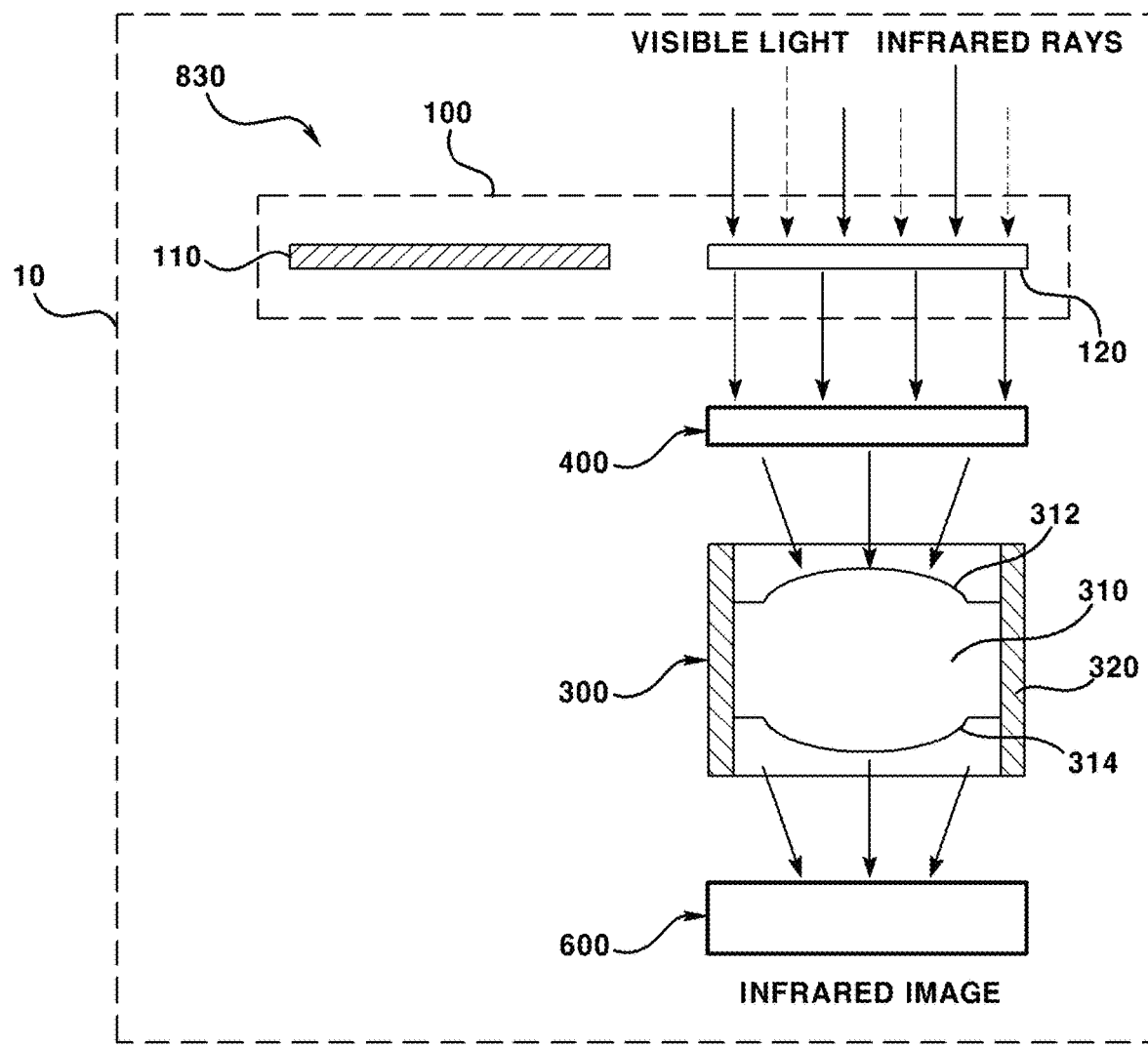
FIGS. 8 and 9 are cross-sectional views illustrating a camera module for both normal photography and infrared photography according to still another exemplary embodiment of the present invention.
Figure 9:
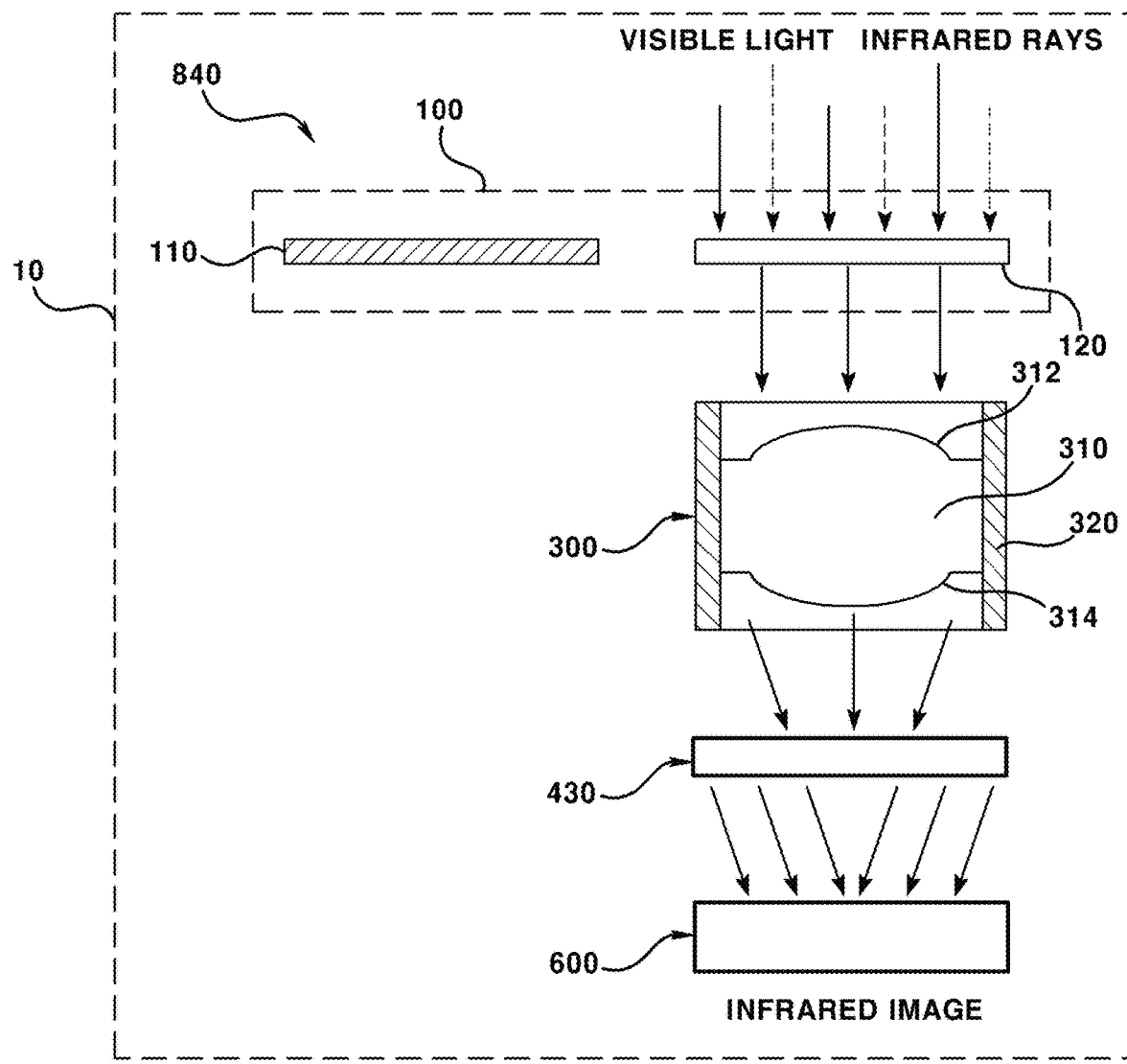

FIGS. 8 and 9 are cross-sectional views illustrating camera modules for both normal photography and infrared photography according to still another exemplary embodiment of the present invention.

The camera modules (830, 840) for both normal photography and infrared photography illustrated in FIGS. 8 and 9 are substantially same as the camera modules for both normal photography and infrared photography illustrated in FIGS. 1-5 except for a lens assembly (300) and viewing angle changing units (400, 430). Thus, redundant explanation of same configurations will be omitted and same reference numerals and designations will be given to the same configurations.

Referring to FIG. 8, the camera module (830) for both normal photography and infrared photography according to another exemplary embodiment of the present invention may include an optical filter unit (100), an angle-of-view changing unit (400), a lens assembly (300) and an image sensor (600). In the exemplary embodiment of the present invention, the optical filter unit (100), the angle-of-view changing unit (410), the lens assembly (300) and the image sensor (600) may all be embedded inside of a case (10).

The lens assembly (300) may be arranged on a light path of infrared rays or of visible light incident on the image sensor (600), and the lens assembly (300) may adjust a focus of infrared rays or visible light. The lens assembly (300) may include at least one optical lens (310) and a body (320) fixing the optical lens (310).

The optical lens (310) in the exemplary embodiment of the present invention may include an incident surface (312) incident by the visible light or the infrared rays, and a light emitting surface (314) emitting the incident visible light or infrared rays.

The body (320) may be formed with a pipe shape formed with a hollow hole to fix the optical lens (310) at a predetermined area, where the optical lens (310) may be disposed at an inside of the body (320).

Referring to FIG. 8, the viewing angle changing unit (400) may be disposed to face the incident surface (312) of the optical lens (310) in the lens assembly (300). Meantime, referring to FIG. 9, the viewing angle changing unit (400) may be disposed to face the light emitting surface (312) of the optical lens (310) in the lens assembly (300), and in this case, the viewing angle changing unit (400) may be interposed between the lens assembly (300) and the image sensor (600).

Although the viewing angle changing unit (400) illustrated in FIG. 8 to be spaced apart from the infrared transmission filter (120), the viewing angle changing unit (400) as illustrated in FIG. 8 may be integrally formed with the infrared transmission filter (120) or may be mutually coupled with the coupling member.

In the exemplary embodiment of the present invention, the viewing angle changing unit (400) may be manufactured with a plane area less than a plane area of the optical lens (310) at the lens assembly (300) when the camera module for both normal photography and infrared photography includes a lens assembly (300) including an optical lens (310) and a body (320) as illustrated in FIGS. 8 and 9.

Figure 10:
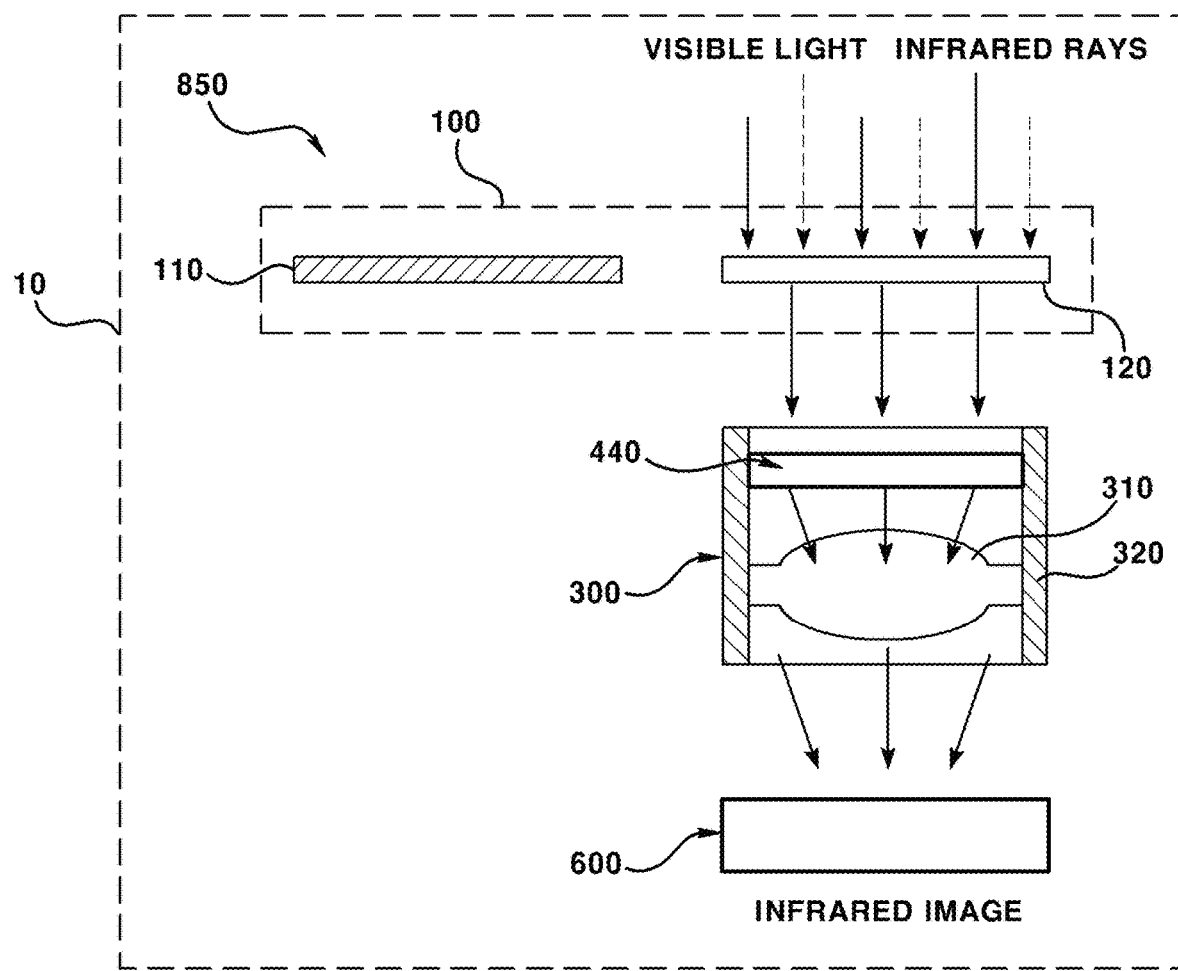
FIG. 10 is a cross-sectional view illustrating a camera module for both normal photography and infrared photography according to still another exemplary embodiment of the present invention.

FIG. 10 is a cross-sectional view illustrating a camera module for both normal photography and infrared photography according to still another exemplary embodiment of the present invention.

The camera modules (850) for both normal photography and infrared photography illustrated in FIG. 10 is substantially same as the camera modules for both normal photography and infrared photography illustrated in FIGS. 1-5 except for a lens assembly (300) and viewing angle changing units (400, 430). Thus, redundant explanation of same configurations will be omitted and same reference numerals and designations will be given to the same configurations.

Referring to FIG. 10, the camera module (850) for both normal photography and infrared photography according to another exemplary embodiment of the present invention may include an optical filter unit (100), an angle-of-view changing unit (440), a lens assembly (300) and an image sensor (600). In the exemplary embodiment of the present invention, the optical filter unit (100), the angle-of-view changing unit (440), the lens assembly (300) and the image sensor (600) may all be embedded inside of a case (10).

The viewing angle changing unit (440) changing a view angle of infrared rays having passed the infrared transmission filter (120) of the optical filter unit (100) may be disposed at an inside of the body (320) of the lens assembly (300).

The viewing angle changing unit (440) in the exemplary embodiment of the present invention may be disposed at the body (320) facing an incident surface (312) to which an infrared rays or a visible light is incident in the optical lens (310). Alternatively, the viewing angle changing unit (440) may be disposed at the body (320) facing a light emitting surface (314) from which the infrared rays or the visible light is emitted in the optical lens (310), and may be interposed between optical lens when at least two optical lenses are disposed at inside of the body (320).

Figure 11:
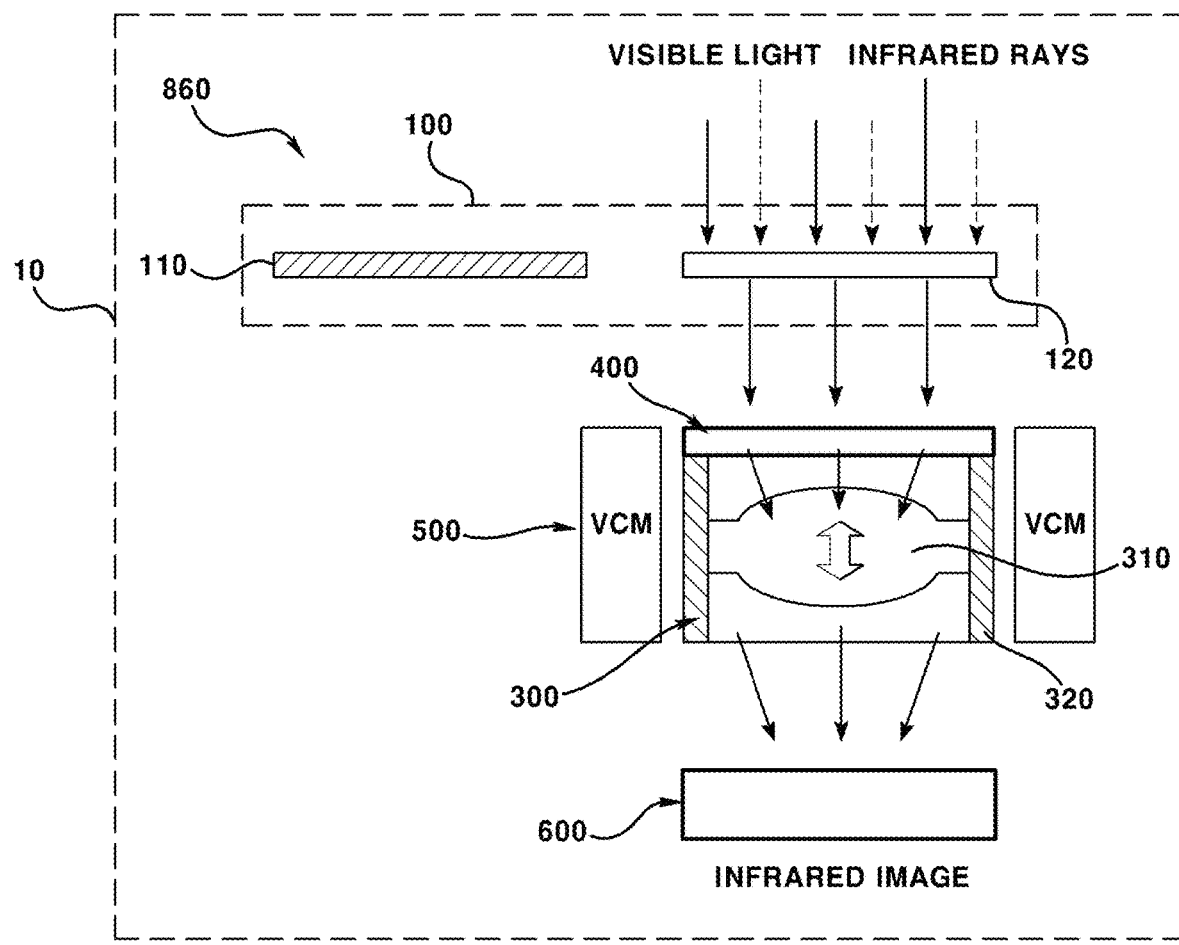
FIG. 11 is a cross-sectional view illustrating a camera module for both normal photography and infrared photography according to still another exemplary embodiment of the present invention.

FIG. 11 is a cross-sectional view illustrating a camera module (820) for both normal photography and infrared photography according to still another exemplary embodiment of the present invention.

The camera modules (860) for both normal photography and infrared photography illustrated in FIG. 11 is substantially same as the camera module for both normal photography and infrared photography illustrated in FIG. 8 except for a VCM (Voice Coil Motor). Thus, redundant explanation of same configurations will be omitted and same reference numerals and designations will be given to the same configurations.

Referring to FIG. 11, the camera module (860) for both normal photography and infrared photography according to another exemplary embodiment of the present invention may include an optical filter unit (100), an angle-of-view changing unit (400), a lens assembly (300), a VCM (500) and an image sensor (600). In the exemplary embodiment of the present invention, the optical filter unit (100), the angle-of-view changing unit (400), the VCM (500), the lens assembly (300) and the image sensor (600) may all be embedded inside of a case (10).

The lens assembly (300) may include an optical lens (310) and a body fixing the optical lens (310). The lens assembly (300) may be disposed at a front side of the image sensor (600), and the lens assembly (300) may be disposed on a light path of infrared rays or visible light incident to the image sensor (600), and the lens assembly (300) may focus the infrared rays or the visible light by a gap formed with the image sensor (600) being adjusted.

The VCM (500) may adjust a gap between the lens assembly (300) and the image sensor (600) by being disposed at an environment of the lens assembly (300). The VCM (500) may include a rotor including a coil disposed at an outer circumferential surface of the body (320) at the lens assembly (300) to generate an electromagnetic force in response to a current applied from outside, and a stator including a permanent magnet disposed to face the rotor to generate an attractive force or a repulsive force in response to the electromagnetic force.

The viewing angle changing unit (400) may be fixed to an upper surface of the body (320) at the lens assembly (300) in the exemplary embodiment of the present invention. The viewing angle changing unit (400) may be formed with a square plate shape, when viewed from a plane surface, and an upper surface of the body (320) at the lens assembly (300) corresponding to the viewing angle changing unit (400) may be formed with a groove for accommodating a corner area of the viewing angle changing unit (400).

An overall height of the lens assembly (300) and the viewing angle changing unit (400) can be further reduced by forming a groove at an upper surface of the body (320) of the lens assembly (300) and by arranging the viewing angle changing unit (400) in the groove, to thereby form a more compact camera module (860) for both normal photography and infrared photography.

As discussed in the foregoing, the camera module for both normal photography and infrared photography according to the present invention is enabled to realize both the iris photographing and normal photographing using a single image sensor.

Furthermore, the present invention can provide a small-sized camera module for both normal photography and infrared photography mountable on a small IT device such as a smart phone, in addition to realization of both the iris photographing and normal photographing using a single image sensor.

Still furthermore, the present invention can provide a camera module to realize both normal photography and infrared photography with a small size using a single image sensor, to enhance the quality of iris image by accurately photographing an iris through decreased viewing angle when photographing an iris, and to realize a normal image with an excellent quality by minimizing decreased viewing angle of visible light during the normal photographing.

Meantime, the exemplary embodiments illustrated in the drawings are intended to provide particular exemplary embodiments to help understand the present invention, and thereby do not limit the scope of protection of the present invention. Thereby, it should be appreciated by the skilled in the art that changes, modifications and amendments to the above examples may be made without deviating from the scope of protection of the invention.

INDUSTRIAL APPLICABILITY

The present invention can be used to a camera module performing a normal photography and infrared photography.

The invention claimed is:

1. A camera module comprising:
an image sensor;
a first lens disposed above the image sensor;
an optical filter unit selectively transmitting infrared rays;
an angle-of-view changing unit fixedly disposed between the optical filter unit and the first lens and comprising a second lens, wherein when infrared rays are received by the second lens of the angle-of-view changing unit, the second lens changes an angle of view of the incident infrared rays in a range between 30° and 60° by refracting the infrared rays while incident angles of the infrared rays with respect to the second lens remain unchanged, and when visible light is received by the second lens of the angle-of-view changing unit, the second lens transmits the visible light without changing the angle of view of the incident visible light while incident angles of the visible light with respect to the second lens remain unchanged; and
a voice coil motor configured to adjust a gap between the first lens and the image sensor in an optical axis direction of the image sensor and comprising a coil and a magnet,
wherein the optical filter unit comprises an infrared cut-off filter cutting off infrared rays, an infrared transmission filter cutting off visible light, a frame connecting the infrared cut-off filter and the infrared transmission filter, and an actuator coupled with the frame,
wherein the actuator is configured to rotate the frame so that any one of the infrared cut-off filter and the infrared transmission filter is aligned with the angle-of-view changing unit,
wherein the infrared cut-off filter is not aligned on the optical axis of the image sensor when the infrared transmission filter is aligned on the optical axis, and
wherein the angle-of-view changing unit is overlapped with the voice coil motor in a direction perpendicular to the optical axis direction.

2. The camera module of claim 1, wherein the infrared rays incident on the image sensor comprise infrared rays reflected from an iris.

3. The camera module of claim 1, wherein the angle-of-view changing unit is disposed on the infrared transmission filter.

4. The camera module of claim 3, wherein the infrared transmission filter and the angle-of-view changing unit are integrally formed.

5. The camera module of claim 3, comprising a coupling member coupling the infrared transmission filter and the angle-of-view changing unit.

6. The camera module of claim 1, wherein the first lens comprises a light emitting surface facing the image sensor and an incident surface opposite to the light emitting surface.

7. The camera module of claim 6, wherein the angle-of-view changing unit is adjacently disposed with the incident surface of the first lens.

8. The camera module of claim 6, comprising a body accommodating the first lens, and wherein the angle-of-view changing unit is disposed at an inside of the body.

9. The camera module of claim 6, wherein the angle-of-view changing unit is so formed as to have an area smaller than a plain area of the first lens.

10. The camera module of claim 1, wherein the second lens of the angle-of-view changing unit is an HOE (Holographic Optical Element) lens, and
wherein the HOE lens of the angle-of-view changing unit has a +power when the infrared rays are incident.

11. The camera module of claim 1, wherein the infrared transmission filter is not aligned on the optical axis when the infrared cut-off filter is aligned on the optical axis.

12. The camera module of claim 1, wherein the optical filter unit is not overlapped with the voice coil motor in the direction perpendicular to the optical axis direction.

13. The camera module of claim 8, wherein the angle-of-view changing unit is formed in a square plate shape, and the body is formed with a coupling groove to fix corners of the angle-of-view changing unit.

14. The camera module of claim 1, comprising an infrared generating device to generate the infrared rays.

15. The camera module of claim 1, wherein the infrared cut-off filter and the infrared transmission filter are disposed on a same planar surface.

16. The camera module of claim 15,
wherein the frame is formed into a bent V-cut plate shape.

17. The camera module of claim 16, wherein the actuator is coupled to a through hole formed at a bent portion of the frame.

18. The camera module of claim 1, wherein the angle-of-view changing unit narrows an angle of view by refracting the infrared rays when the infrared transmission filter is disposed on the optical axis of the first lens, and
wherein the angle-of-view changing unit transmits the visible light without changing the angle of view when the infrared cut-off filter is disposed on the optical axis of the first lens.

19. The camera module of claim 1, wherein the image sensor generates a normal image when the visible light is incident and an infrared image when the infrared rays are incident.

20. The camera module of claim 1, comprising a body disposed between the image sensor and the optical filter unit,
wherein the first lens is disposed in the body,
wherein the angle-of-view changing unit is directly contacted with an upper surface of the body, and
wherein the coil of the voice coil motor is disposed on an outer circumferential surface of the body.

* * * * *